United States Patent [19]
Lee et al.

[11] Patent Number: 5,950,875
[45] Date of Patent: Sep. 14, 1999

[54] MODULAR FOAM DISPENSER

[75] Inventors: William Lee, Durham, N.C.; John Joseph Corrigan, III, Washington, Conn.; George Teofilius Bertram, Newtown, Conn.; Robert Neil Fleming, New Milford, Conn.

[73] Assignee: Sealed Air Corporation, Danbury, Conn.

[21] Appl. No.: 09/052,640

[22] Filed: Mar. 31, 1998

Related U.S. Application Data

[63] Continuation-in-part of application No. 08/565,021, Nov. 30, 1995, Pat. No. 5,791,522.

[51] Int. Cl.$^6$ ......................................................... B67D 5/60
[52] U.S. Cl. ........................................ 222/145.5; 222/504
[58] Field of Search ................................. 222/145.5, 333, 222/504; 239/343

[56] References Cited

U.S. PATENT DOCUMENTS

| | | |
|---|---|---|
| 3,687,370 | 8/1972 | Sperry . |
| 3,945,569 | 3/1976 | Sperry . |
| 4,023,733 | 5/1977 | Sperry . |
| 4,159,079 | 6/1979 | Phillips, Jr. . |
| 4,426,023 | 1/1984 | Sperry et al. . |
| 4,469,130 | 9/1984 | James et al. . |
| 4,469,251 | 9/1984 | Sperry et al. . |
| 4,568,003 | 2/1986 | Sperry et al. . |
| 4,674,268 | 6/1987 | Gavronsky et al. . |
| 4,800,708 | 1/1989 | Sperry . |
| 4,854,109 | 8/1989 | Pinarer et al. . |
| 4,913,317 | 4/1990 | Wernicke . |
| 4,938,007 | 7/1990 | Sperry . |
| 4,993,596 | 2/1991 | Brown . |
| 4,999,975 | 3/1991 | Willden et al. . |
| 5,022,217 | 6/1991 | Vilas Boas et al. . |
| 5,027,583 | 7/1991 | Chelak . |
| 5,180,082 | 1/1993 | Cherfane . |
| 5,186,905 | 2/1993 | Bertram et al. . |
| 5,215,226 | 6/1993 | Bertram et al. . |
| 5,246,143 | 9/1993 | Cherfane . |
| 5,255,847 | 10/1993 | Sperry et al. . |
| 5,335,483 | 8/1994 | Gavronsky et al. . |
| 5,339,991 | 8/1994 | Snyder . |
| 5,375,743 | 12/1994 | Soudan . |
| 5,376,219 | 12/1994 | Sperry et al. . |
| 5,791,522 | 8/1998 | Lee et al. ................................. 222/504 |

OTHER PUBLICATIONS

PCT International Search Report, PCT/US96/18015, Feb. 17, 1997, pp. 1–5.

*Primary Examiner*—Philippe Derakshani
*Attorney, Agent, or Firm*—Alston & Bird LLP

[57] ABSTRACT

A dispenser for mixing foam precursor chemicals and dispensing the foamable mixture includes a first module containing shutoff valves and a second module containing a dispensing valve assembly. The dispensing valve assembly includes a valve body of a self-lubricating material and a valving rod which is reciprocatingly retracted in a valve passage of the valve body to uncover orifices which supply the precursor fluids into the valve passage, from which the mixed chemicals are dispensed. The dispensing valve assembly includes a die spring which urges a washer to compress the valve body along its axis to help prevent cold flow of the valve body away from the valving rod. The valving rod is scraped by inner surfaces of the hole in the washer through which the valving rod is retracted and extended. The die spring is preloaded and retained by a load cylinder which is fixed in the bore in the second housing which contains the dispensing valve.

45 Claims, 5 Drawing Sheets

MODULAR FOAM DISPENSER

CROSS-REFERENCE TO RELATED APPLICATION

This application is a continuation-in-part of U.S. patent application Ser. No. 08/565,021 entitled "Modular Narrow Profile Foam Dispenser" filed on Nov. 30, 1995, now U.S. Pat. No. 5,791,522.

FIELD OF THE INVENTION

The present invention relates to cushioned packaging apparatus, and particularly to devices for dispensing foamable compositions which expand to form foam cushions.

BACKGROUND OF THE INVENTION

The present invention relates to the use of foamable compositions for packaging purposes. In a number of packaging applications, fragile articles or those otherwise needing protection from undesired movement or breakage, particularly items with irregular shapes and sizes, have been packed in loose, friable or dunnage-type materials or in protective foamed polymer packaging materials, such as injection molded styrofoam, styrofoam chips, or other similar materials.

The present invention relates to foam-in-place packaging, a technique that provides a useful alternative for packaging fragile or other items.

As its name implies, foam-in-place packaging comprises generating the foam cushioning while the articles to be protected are being packaged. For example, when certain chemicals are mixed, they form polymeric products while at the same time generating gases, such as carbon dioxide and water vapor. If such chemicals are selected as being those that harden relatively quickly, they can be used to form hardened polymer foams in which the foam is produced by the gaseous carbon dioxide and water vapor leaving the mixture as it hardens. Typical foamable compositions include urethane precursors which, when mixed, generate polyurethane, carbon dioxide, and water vapor. As the urethane forms and hardens, these gases are concurrently generated so that by the time the urethane sets (generally a relatively short period of a few minutes or less) it takes the form of a polymer foam that has expanded to fill the void spaces in the container and to thereby cushion the item being packaged.

One technique for foam-in-place packaging is to place the object to be packaged in a container, cover it with a polymer film or other material which will protect it from liquids, inject a certain amount of foamable composition into the remainder of the container, and then close the container. As the composition foams, it fills the remainder of the container, forming a custom-shaped foam cushion surrounding the article. Another foam-in-place packaging technique is to form discrete flexible bags and inject a foamable composition into the bags and seal them, whereupon one or more bags are placed into the carton while the foam-forming reaction is taking place and the bags are subsequently expanded by the expanding foam to fill the void space in the carton, the foam then hardening to form custom-shaped cushions protecting the packaged article. In either technique, foam-in-place packaging can be accomplished with a supply of foamable chemicals, usually two, and an injection dispenser connected to the supplies of the respective chemicals. The chemicals are mixed within the dispenser to form the foamable composition. Examples of earlier versions of such dispenser include those described in U.S. Pat. Nos. 3,687,370; 3,945,569; 4,023,733; 4,159,079; and 4,426,023. These patents describe dispensers in which a reciprocally mounted valving rod is movable within a bore into which the foam precursor fluids are introduced through orifices, the bore defining a mixing chamber where the precursor fluids are mixed. The mixed fluids are dispensed out a dispensing opening at one end of the bore when the valving rod is retracted sufficiently to uncover the orifices supplying the fluids to the mixing chamber.

One of the design challenges in making a dispenser for foamable compositions is preventing unwanted accumulation of foam deposits on components of the dispenser, which deposits can build up to the point of rendering the dispenser unreliable or completely nonfunctional. For example, in the dispenser of the type described in the aforementioned patents, a portion of the valving rod is exposed to the precursor fluids, and the inner surfaces of the mixing chamber and other component surfaces are contacted by the exiting foamable composition. Although the valving rod, upon being extended to close the orifices at the end of a dispensing cycle, will to some extent wipe the inner surfaces of the mixing chamber and a portion of the outer surface of the valving rod which moves through the mixing chamber, this cleaning action is in general insufficient to prevent foam chemical deposits from accumulating on the valving rod, which eventually build up and impair the movement of the rod. Moreover, the end or tip of the valving rod is an area that is especially susceptible to accumulations of foam deposits because the wiping action caused by movement of the valving rod is ineffective in cleaning foam deposits from the tip. Furthermore, foam deposits may accumulate in the orifices, another area which is not cleaned by the wiping action of the valving rod.

Prior attempts to deal with the problem of foam deposit fouling of dispensers have focused on designing the dispensers to be readily disassembled to allow the fouled components to be cleaned and reused, and/or designing the dispensers to allow solvents to be introduced into the dispensers to help prevent formation of foam on the components. For example, some dispensers have used solvent chambers which bathe the valving rod in solvent, so that at least a portion of the valving rod which is exposed to the foamable composition is retracted into the solvent chamber during a dispense cycle and exposed to solvent. However, the time required to disassemble a dispenser in order to perform maintenance represents costs in terms of lost productivity and labor cost. Furthermore, although solvent chambers are somewhat effective in helping slow the build-up of deposits on the valving rod, solvent chambers alone are not fully satisfactory solutions to the problem.

Yet another problem with prior dispensers is the tendency of the interference fit between the valving rod and the mixing chamber, which is needed to assure complete stoppage of flow into the mixing chamber when a dispense cycle has been completed, to be degraded through use. Loss of the interference fit results in loss of the ability of the valving rod to effectively seal the orifices into the mixing chamber when the dispensing valve is closed, thus causing leakage of the precursor fluids into the mixing chamber and fouling thereof. The valve body which forms the mixing chamber is typically constructed of a self-lubricating material such as tetrafluoroethylene (TFE) or polytetrafluoroethylene (PTFE). Because these materials have a tendency to cold flow, the repeated sliding of the valving rod into and out of the mixing chamber causes cold working of the valve body, thus causing the degradation in fit between the mixing chamber and the valving rod. Prior attempts to solve the problem have concentrated on applying a restraining force on the valve body via a plurality of stacked Belleville washers which are axially compressed against the valve body to help prevent the cold working of the material. However, Belleville washers have a limited range of movement over which they can maintain a resiliency, and accordingly, the washers have a tendency to lose their restoring force if they are over-extended during installation or use.

Another issue associated with dispensers is that there are advantages in forming a dispenser in modular form such that the components which are most likely to fail or need maintenance or replacement are placed in one module and the more durable components are placed in another module, so that the amount of disassembly required for maintenance and repair can be limited to as great an extent as possible. Specifically, in the case of dispensers of foamable compositions, there are advantages in placing the mixing chamber in one module and the fluid flow control components such as on-off valves in another module. For example, U.S. Pat. No. 4,469,251 describes a hand-held dispenser gun having a detachable mixing chamber. The dispenser includes a control assembly with valves for supplying or interrupting supply of the precursor fluids to the mixing chamber, a head section of the control assembly having two fluid passages for the two precursor fluids. The mixing chamber is removably mounted to the head section by a threaded rod mounted on the mixing chamber and extending through a threaded hole in a rotatable knob secured to the head section, the mixing chamber having apertures into the bore of the mixing chamber which align with the fluid passages in the head section and are sealed thereto by O-rings.

One of the challenges in making such a modular dispenser is preventing leakage at the junctures between the fluid passages of one module and the adjoining fluid passages of another module as fluid is passed through the one module and into the other. Where compressible seals are used for sealing, there is a need to assure a continuous compression force between the modules which will not be lost during use.

SUMMARY OF THE INVENTION

The present invention provides a dispenser for foamable compositions which overcomes the problems associated with prior dispensers noted above. In accordance with a first aspect of the invention, the dispenser comprises a housing including an axial bore extending therethrough and fluid flow passages in fluid communication with the bore. A dispensing valve is disposed within the bore, including a valve body of a plastic, preferably self-lubricating, material having an axial valve passage therethrough and orifices into the valve passage which are in fluid communication with the fluid flow passages of the housing. A valving rod is axially retractable within the valve passage from a non-dispensing position to a dispensing position in which the valving rod is retracted to uncover the orifices and permit fluids to flow into the valving passage and be dispensed from one end thereof. A coil compression spring is disposed in the bore and preloaded to apply a substantially constant compression force on the valve body in a direction along the axis of the valving rod. The compressive load on the valve body helps to counteract the tendency of the valve passage to be made larger through cold working of the valve body by the valving rod. Further, the coil compression spring remains effective over a larger range of motion in comparison with Belleville washers.

Advantageously, a stepped washer is disposed between one end of the compression spring and the valve body for receiving the force of the spring and distributing the load over the end face of the valve body. A smaller-diameter portion of the washer has an outer diameter about equal to that of the valve body and abuts the valve body. The spring bears against the larger-diameter portion, which resides within a correspondingly larger-diameter portion of the bore. Further advantageously, the compression spring has a diameter larger than that of the valve body.

For cleaning the valving rod, the valving rod extends through a hole in the stepped washer and inner surfaces of the washer fit closely about the valving rod. Accordingly, reciprocating motion of the valving rod through the hole causes the valving rod to be scraped by the inner surfaces of the hole for cleaning foam residue from the rod. The portion of the bore in which the compression spring and stepped washer reside preferably comprises a solvent chamber which is sealed for containing solvent. Thus, the valving rod is cleaned by being both bathed in solvent and scraped by the stepped washer.

In accordance with a further aspect of the invention, the valving rod is scraped by a helically formed spring having a plurality of helical turns. The spring in a relaxed state has an inner diameter which is smaller than the diameter of the valving rod. The spring is press fit over the valving rod and resides in the solvent chamber between a pair of members which the springs alternately abuts during retraction and extension of the valving rod. Once the spring abuts one of the members, frictional forces between the valving rod and the spring exert a compressive force on the spring which causes the spring to expand in diameter so that relative sliding motion occurs between the valving rod and the spring. Accordingly, the valving rod is scraped by the spring.

In accordance with another aspect of the invention, the dispenser includes a cap which defines the dispensing opening through which the mixed precursor fluids flow upon exiting the valve passage. The valving rod extends through an axial hole in the cap, and the cap has an inner surface which defines an annular chamber surrounding the valving rod. The annular chamber extends to an outer face of the cap, and the dispenser housing includes a solvent passage extending into the annular chamber for supplying solvent thereinto. When the valving rod is in the non-dispensing position shutting off flow of precursor fluids, the tip of the valving rod is exposed to the annular chamber. Thus, foam residue is cleaned from the valving rod tip at the end of a dispense cycle by supplying solvent under pressure to the annular chamber, whereupon the solvent flows outwardly from the annular chamber and over the tip of the rod.

Preferably, the outer face of the cap is coated with a release material such as PTFE or the like for reducing tendency of foam residue to adhere to the cap and for improving a user's ability to remove any foam residue which does adhere. Additionally, the portion of the cap which defines the annular chamber preferably is constructed of a solid material such as PTFE or the like. The cap outer face adjacent the valving rod advantageously is frustoconically shaped for reducing the tendency for exiting foamable composition to turn the corner at the exit of the cap and flow onto the outer face thereof.

The valving rod tip preferably is rounded to promote flow of solvent over the tip. More preferably, the tip is frustoconical with a rounded apex, the tip forming an extension of the frustoconical cap. Further, the rounded tip is preferably coated with a release material.

A further aspect of the invention provides an alternative dispenser tip assembly for cleaning the tip of the valving rod. In accordance with this embodiment of the invention, the dispenser tip assembly includes a threaded removable cap which holds an insert of a sintered material. The cap is screwed into a threaded hole in the housing such that the tip of the valving rod extends through a central hole of the sintered insert. A solvent chamber in the axial bore of the dispensing valve is supplied with a solvent/air mixture, and the solvent chamber is adjacent the sintered insert such that solvent is forced through the pores of the sintered insert to clean the valving rod tip at the end of a dispense cycle.

According to a still further aspect of the invention, the dispenser includes access ports which extend through the housing and are aligned with the orifices of the valve body. The access ports extend into the orifice passages, thus providing paths for the passage of a cleaning tool into each of the orifices. During use of the dispenser, the access ports are sealed by removable seal plugs. When the orifices are to be cleaned, the seal plugs are removed (after shutting off supply of precursor fluids to the dispenser valve) and the valving rod is retracted to uncover the orifices. The orifices may then be cleaned by passing a cleaning tool through the access ports and into the orifices.

In accordance with yet another aspect of the invention, the dispenser includes a modular design comprising first and second modules. The first module includes a first housing having fluid flow passages extending therethrough to a mating face of the first housing. The second module includes a second housing having an axial bore formed through it, and fluid flow passages extending from a mating face of the second housing into the bore and adapted to receive fluid from the fluid flow passages of the first module. The bore extends generally parallel to the mating face of the second housing. The dispenser includes a fastener for securing the first and second modules together with the respective mating faces abutting each other. A dispensing valve assembly is contained within the bore, including a reciprocatingly movable valving rod and a valve body through which the valving rod extends adjacent one end of the bore.

For restraining relative movement between the modules caused by the forces exerted for reciprocatingly moving the valving rod, the dispenser includes a member fixed to the second housing and projecting outward therefrom adjacent the end of the bore opposite from the valve body. The member has a thrust-bearing projection which protrudes from the member generally normal to the axis of the bore. The first housing includes a groove which engages the thrust-bearing projection, thus constraining the modules against substantial relative movement along the direction defined by the axis of the bore.

Preferably, the member fixed to the housing comprises a load cylinder through which the valving rod extends and which is partially inserted and fixed into the bore adjacent the other end thereof, an end portion of the load cylinder extending from the bore, the end portion having the radially protruding thrust-bearing projection thereon. The second housing also includes a groove which receives the thrust-bearing projection. The thrust-bearing projection advantageously comprises a thrust ring fixed on the load cylinder and protruding radially outward. The groove in the first housing is advantageously formed in a recess in the first housing which is formed as a portion of a load cylinder for receiving the end portion of the load cylinder extending from the bore in the second housing.

The dispenser preferably also includes compressible seals disposed between the mating faces of the modules for sealing the junctures between the fluid flow passages of the respective modules. Accordingly, the dispenser includes features for maintaining the mating faces of the modules in firm contact so that the seals are maintained in a state of compression for assuring substantially leak-free sealing of the flow passages. More particularly, one of the housings includes a tang projecting from its mating face and the other housing has a slot extending into the housing from its mating face for receiving the tang. The tang includes a tapered key hole, and the housing having the slot has a hole extending into the slot. A bolt having a frustoconical portion extends through the hole into the slot and engages the tapered key hole.

The hole through which the bolt extends is offset relative to the key hole when the respective mating faces of the housings are abutting each other, the hole being offset in the direction along which the tang is inserted into the slot. The frustoconical portion of the bolt thus exerts a force on the tang urging the mating faces of the modules together.

The tang is split from the key hole to the free end of the tang to permit elastic expansion of the split end as the bolt is engaged in the tapered key hole. The elastically expanded spit end acts as a spring exerting continuous force on the bolt urging the two modules together.

BRIEF DESCRIPTION OF THE DRAWINGS

The foregoing and other objects, advantages and features of the invention, and the manner in which the same are accomplished, will become more readily apparent upon consideration of the following detailed description of the invention taken in conjunction with the accompanying drawings, which illustrate preferred and exemplary embodiments and wherein.

DETAILED DESCRIPTION OF THE DRAWINGS

Figures 1, 2:
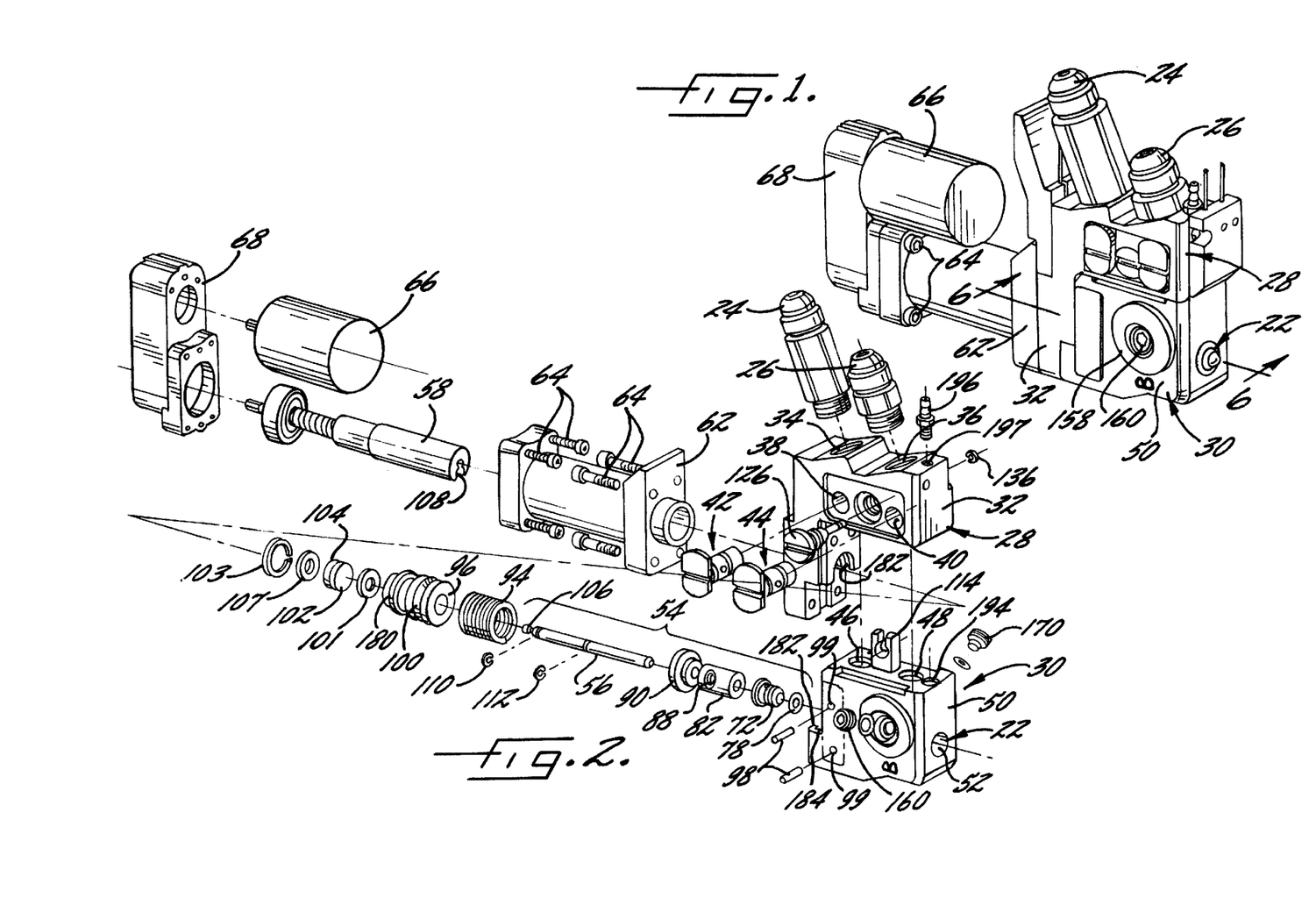
FIG. 1 is a perspective view of a dispenser in accordance with the invention.
FIG. 2 is an exploded perspective view of the dispenser of FIG. 1.

With reference to FIGS. 1 and 2, a dispenser 20 for dispensing foamable compositions is shown. The dispenser is of the type which is supplied with two separate liquid precursor chemicals from suitable sources. The two precursor fluids are mixed within the dispenser 20 and the mixture is then immediately dispensed from a dispensing opening denoted generally by reference numeral 22.

The dispenser 20 includes two fluid flow fittings 24 and 26 each of which is adapted to be connected to a hose or line for supplying precursor fluid to the dispenser. As noted above, one of the common ways of forming foam is to use two foam precursor materials which when mixed together form a foaming composition, and thus the dispenser 20 will commonly include two fluid flow fittings, although it will be understood that the number of fittings is not limited to two in other circumstances. The fluid flow fittings 24 and 26 are connected to a first module 28 of the dispenser containing valving which is operable to permit or interrupt supply of the precursor fluids to other parts of the dispenser. The first module 28 attaches to a second module 30 containing a dispensing valve which is operable to selectively open for dispensing foamable mixture or close for interrupting the dispensing of foamable mixture.

The first module 28 includes a first housing 32 having a pair of fluid flow passages 34 and 36 to which the fluid flow fittings 24 and 26, respectively, are connected for supplying precursor fluids into the fluid flow passages. The fluid flow passages 34 and 36 are in fluid communication with a pair of valve chambers 38 and 40, respectively, formed in the first housing 32. Valve members 42 and 44 are disposed in the valve chambers 38 and 40, respectively, and are operable for permitting or preventing flow of precursor fluids from the valve chambers 38 and 40 to respective fluid flow passages (not shown in FIGS. 1 and 2, but further described below in connection with FIG. 7) which extend to a mating face of the first housing 32 for connection with corresponding fluid flow passages 46 and 48, respectively, of the second module 30.

The second module 30 includes a second housing 50 in which the fluid flow passages 46 and 48 are formed. The fluid flow passages 46 and 48 are in fluid communication with an axial bore 52 formed through the second housing 50. A dispensing valve broadly designated as 54 is contained within the bore 52, the construction and operation of which are further described below. The dispensing valve 54 is operated by a retractable and extendable valving rod 56.

The valving rod 56 is reciprocatingly retracted and extended by a piston 58 which is threaded onto a helically threaded shaft 60, the piston and shaft being contained in a suitable housing 62 which is secured to the first housing 32 by bolts 64. The shaft 60 is rotated one direction or the other for retracting or extending the valving rod by a motor 66 and transmission 68 which is secured to the housing 62 by bolts 68. It will be appreciated, however, that other types of actuators may alternatively be used for effecting reciprocating motion of the valving rod 56.

Figure 6:
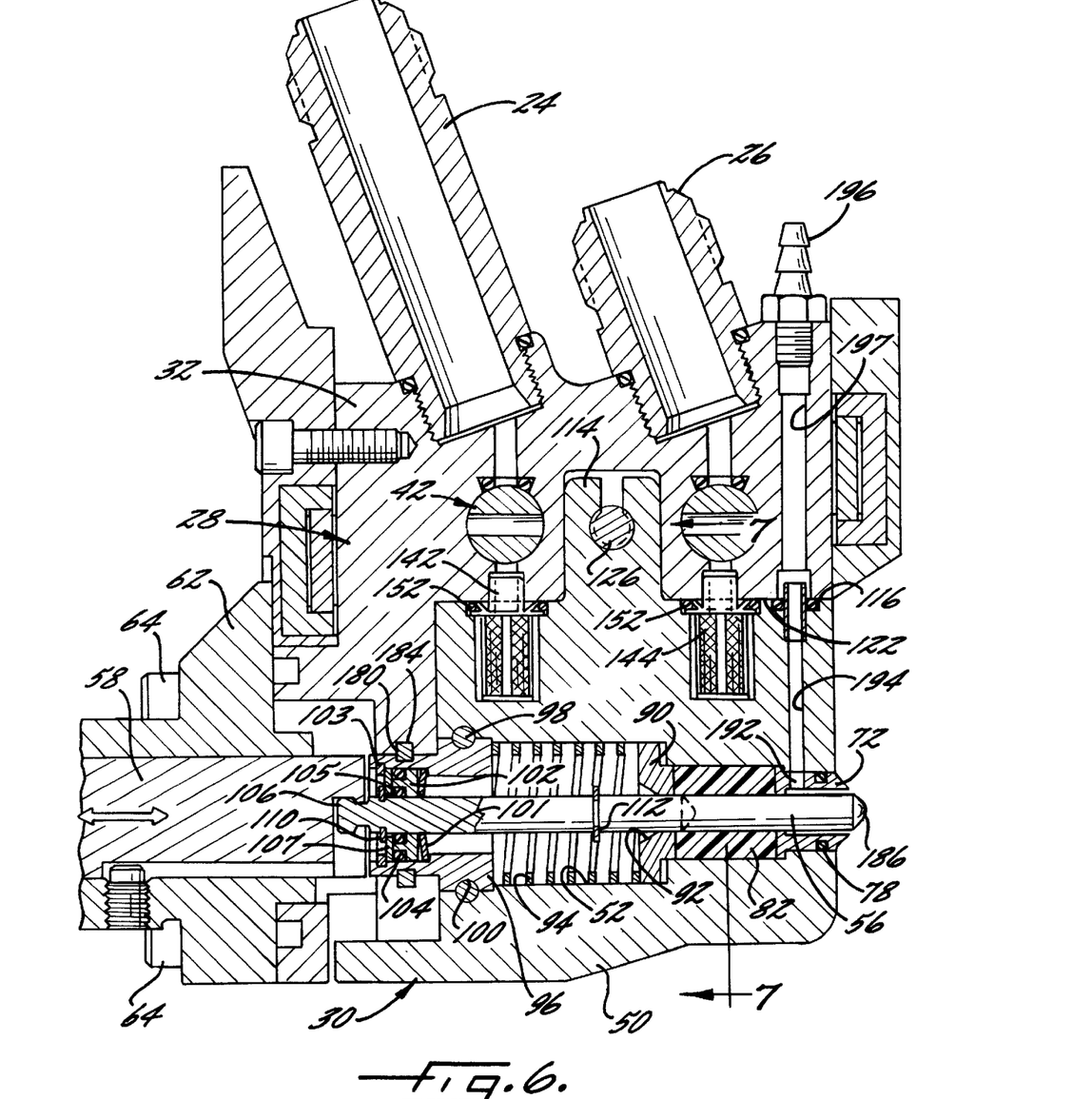
FIG. 6 is a cross-sectional view on a plane through the axis of the dispensing valve.

The construction and operation of the dispensing valve 54 is now explained with primary reference to FIG. 2 and to FIG. 6 which depicts the dispensing valve 54 in greater detail. The components of the valve 54 are inserted coaxially into the bore 52 in second housing 50 through one end 70 of the bore. A cap 72 (best seen in FIG. 9) is inserted to the other end of the bore, and comprises a generally cylindrical member having an axial hole 74 extending through it, and a radially projecting flange 76 at the rear end of the cap which abuts a corresponding step in the bore 52 for preventing the cap 72 from being expelled out the end of the bore. An O-ring 78 retained in a circular groove 80 in the outer surface of the cap 72 seals the juncture between the cap and the bore.

A generally cylindrical valve body 82 is inserted into the bore 52 behind the cap 72. The valve body 82 includes an axial cylindrical valve passage 84 coaxially aligned with and of substantially the same diameter as the hole 74 in the cap 72. The outer diameter of the valve body 82 is substantially the same as that of the flange 76 on the cap 72. The valve body 82 preferably fits in the bore 52 with a slight interference. The valve body 82 includes a pair of nozzles or orifices 86 and 88 which extend through the side wall of the valve body into the valve passage 84 for supplying the two precursor fluids into the valve passage. The nozzles 86 and 88 are constructed of a non-deformable material such as stainless steel, and are preferably of the type described in U.S. Pat. No. 5,186,905, assigned to the assignee of the present application and incorporated herein by reference. Thus, the valve passage 84 constitutes a mixing chamber in which the two precursor fluids mix prior to being dispensed from the dispenser. The orifices 86 and 88 are in fluid communication with the fluid flow passages 46 and 48, respectively, as further described below in connection with FIG. 7.

A stepped washer 90 is inserted behind and abuts the valve body 82. The stepped washer 90 includes a hole 92 coaxially aligned with the valve passage 84. A smaller-diameter portion of the washer 90 is of substantially the same outer diameter as that of the valve body 82. A cylindrical coil compression spring or die spring 94 is inserted into the bore 52 behind the stepped washer 90 and abuts the larger-diameter portion of the washer. As further explained below, the die spring 94 serves to apply a substantially constant compressive load on the washer 90, and hence on the valve body 82, which is constructed of a self-lubricating material such as PTFE to reduce adhesion of foam deposits thereto.

The die spring 94 is preloaded by being compressed between the stepped washer 90 and a load cylinder 96 which is inserted into the end 70 of the bore 52. The load cylinder 96 includes an axially extending hollow cylindrical portion which abuts and compresses the die spring 94. The load cylinder 96 is fixed in the bore by a pair of pins 98 which extend through holes 99 in the second housing 50 and engage a circumferential groove 100 in the outer surface of the load cylinder 96. The holes 99 for the pins 98 extend into the second housing 50 from one side face thereof, but do not extend through to the opposite side face of the housing. After the pins 98 are installed, they are covered by a cover plate or label 101 (FIG. 1).

The dispensing valve assembly further includes an O-ring housing 102 which is coaxially retained within the load cylinder 96 by a snap ring 103 and a washer 107 and which supports an outer O-ring 104 for sealing against the inner surface of the load cylinder and an inner O-ring 105 for sealing against the outer surface of the valving rod 56 so as to seal the rear end of the valve assembly. Additionally, a Belleville washer 101 is disposed between the O-ring housing 102 and an annular shoulder on the inner surface of the load cylinder 96.

The valving rod 56 includes a dove-tail end portion 106 which fits within a corresponding dove-tail slot 108 in the piston 58. The valving rod 56 is extended by the piston 58 coaxially through the load cylinder 96, die spring 94, stepped washer 90, valve body 82, and cap 72, to a non-dispensing position in which the tip of the valving rod extends slightly outward from the cap 72 as indicated in solid line in FIG. 6. A snap ring 110 secured to the valving rod 56 abuts the O-ring housing 102 to define the fully extended non-dispensing position of the valving rod.

There is a slight interference fit between the valving rod 56 and the valve body 82. Thus, in the non-dispensing position in which the valving rod 56 covers the orifices 86 and 88 of the valve body, the valving rod 56 prevents fluid flow through the orifices into the valve passage or mixing chamber 84.

To initiate a dispense cycle, the valving rod 56 is retracted by the piston 58 to the dispensing position indicated in phantom line in FIG. 6, thus uncovering the orifices 86 and 88 and permitting the precursor fluids to flow into the mixing chamber 84 and out the central hole of the cap 72. The valving rod 56 includes a snap ring 112 which abuts the Belleville washer 101 when the valving rod is fully retracted.

Because the valve body 82 (except for the nozzles 86 and 88) is constructed of a deformable self-lubricating material such as TFE or PTFE, which tends to cold flow, the interference fit between the valving rod 56 and the valve body 82 which exists when the valve body is new tends to lessen over time and use unless steps are taken to prevent the cold flowing of the valve body in response to the forces exerted on it by the valving rod. Because of Poisson's ratio, any increase in diameter of the mixing chamber 84 is accompanied by an increase in length of the valve body (the outer diameter of the valve body 82 being held fixed by the bore 52). The die spring 94 applies a compressive load of substantially constant magnitude on the valve body 82 so as to substantially prevent this increase in length and, consequently, substantially prevent the accompanying increase in inner diameter of the mixing chamber. Thus, proper sealing of the orifices of the valve body by the valving rod is maintained for a longer period of use.

Figures 3, 4, 5:
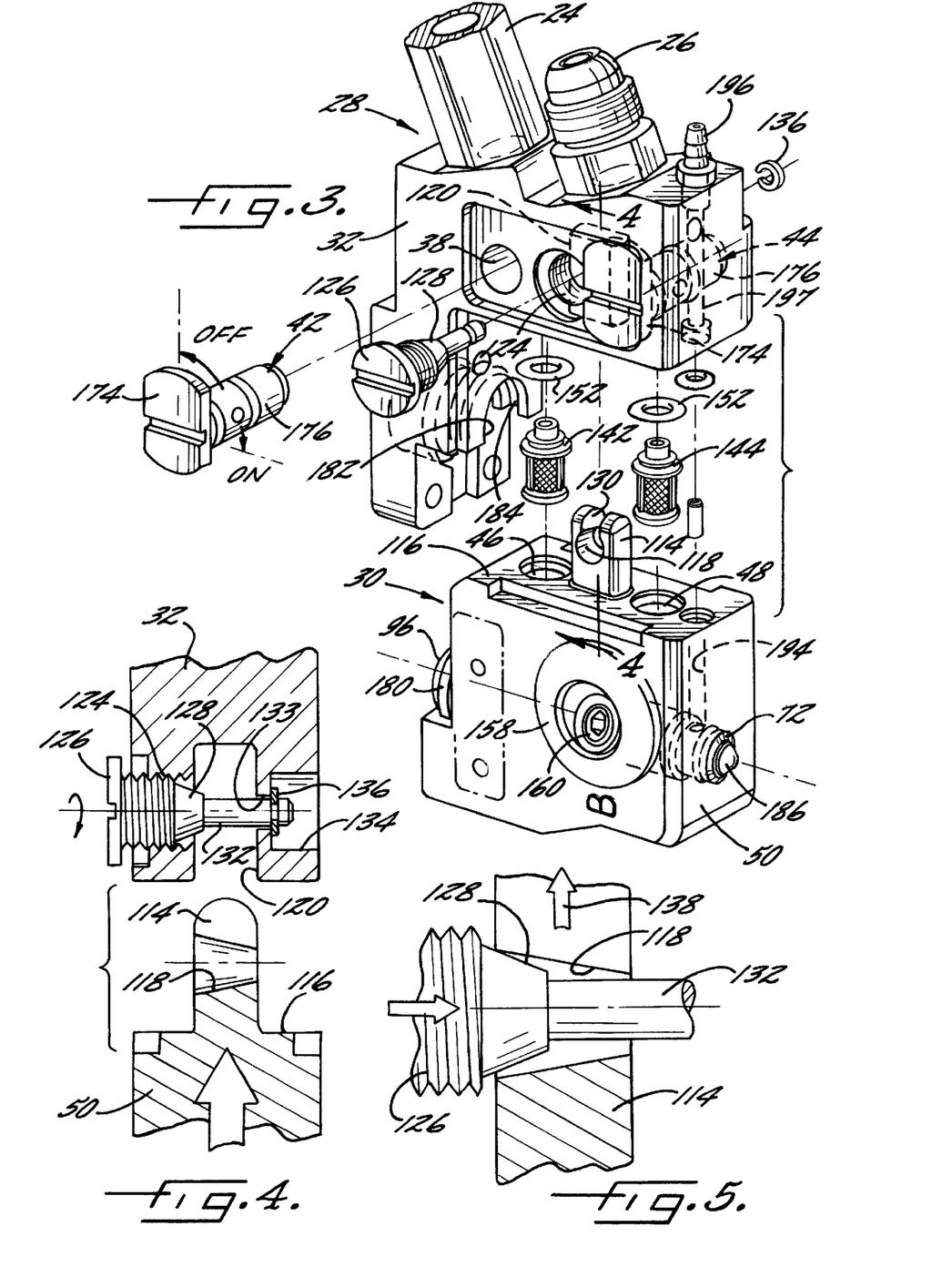
FIG. 3 is an exploded view illustrating the modular assembly of the dispenser.
FIG. 4 is a cross-sectional view taken on line 4—4 of FIG. 3 showing details of the tang and bolt mechanism for securing the modules together.
FIG. 5 is a cross-sectional view showing the bolt engaged in the tapered key hole of the tang.

FIGS. 3–5 illustrate how the first and second modules of the dispenser are secured together. The second housing 50 includes a tang 114 which projects generally normally outward from a mating face 116 of the second housing. The tang 114 includes a tapered key hole 118 extending through it. The first housing 32 has a slot 120 extending into it from a mating face 122 which is adapted to abut the mating face 116 of the second module. The slot 120 is adapted to receive the tang 114. A threaded hole 124 extends from a side face of the first housing 32 into the slot 120. A threaded bolt 126 is threaded into the hole 124. The bolt 126 includes a frustoconical portion 128 which engages the tapered key hole 118.

The tang 114 is split from the key hole 118 to the free end of the tang, as indicated generally by reference numeral 130. The bolt 126 includes a distal portion 132 of small diameter sized to pass between the split end portions of the tang 114, and the distal portion 132 extends through the slot 120 and through a close-fitting hole 133 into a recess 134 formed in the opposite side face of the first housing 32. A snap ring 136 is secured to the end of the distal portion 132 for captively retaining the bolt 126 to the first module.

Preferably, the bolt hole 124 is offset relative to the key hole 118 when the respective mating faces 116 and 122 of the housings are abutting each other, the hole 124 being offset in the direction along which the tang 114 is inserted into the slot 120. As the bolt 126 is advanced to engage the frustoconical portion 128 of the bolt 126 in the key hole 118, the frustoconical portion 128 thus exerts a force on the tang 114 in the direction indicated by arrow 138 in FIG. 5, urging the mating faces of the modules together.

The interference between the bolt 126 and key hole 118 causes the split end portions of the tang 114 to be elastically spread apart when the bolt 126 is fully seated. The elastically expanded end portions of the tang act as springs, exerting spring forces on the frustoconical portion 128 of the bolt. These forces include components which act to draw the second module 30 against the first module 28. Thus, the split tang and bolt provide a continuous force urging the modules together.

Figures 7, 9:
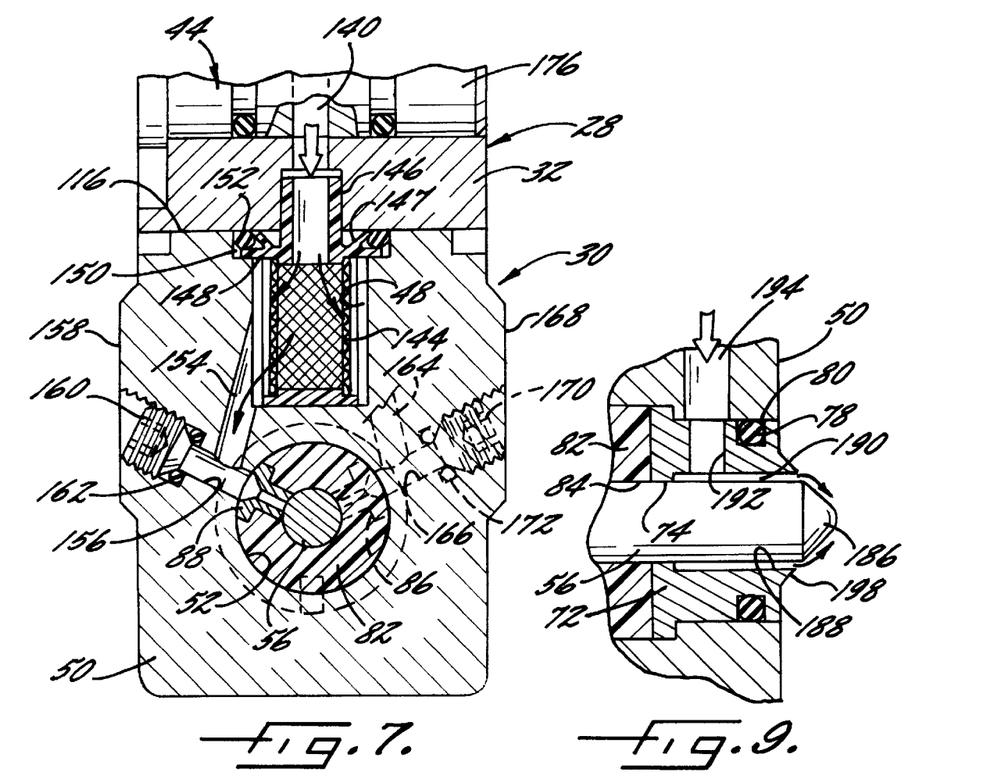
FIG. 7 is a cross-sectional view taken on line 7—7 of FIG. 6 showing the access ports and one of the filters.
FIG. 9 is a cross-sectional view similar to FIG. 6, on an enlarged scale, showing the solvent passage into the annular chamber of the cap at the tip of the dispensing valve.

This continuous force is important for maintaining sufficient compression of resiliently compressible seals which seal the junctures between the fluid flow passages of the two modules. More particularly, with reference to FIGS. 3 and 7, the first housing 32 includes a pair of fluid flow passages extending from the valve chambers 38 and 40 to the mating face 122 of the first housing. Only one of these fluid flow passages 140 is shown in FIG. 7, being the passage which connects with the valve chamber 40, but it will be understood that there is a corresponding fluid flow passage 140 associated with the other valve chamber 38. The fluid flow passages 140 of the first module align with the fluid flow passages 46 and 48 of the second modules when the modules are secured together. Filters 142 and 144 are disposed in the second module flow passages 46 and 48, respectively, and include cylindrical tube inlet portions 146 which extend partially into the flow passages 140 of the first module. The filters include annular flanges 148 which are seated in recesses 150 in the mating face 116 of the second housing 50. Each filter also includes a hollow deformable generally conical protrusion 147 which surrounds the tube inlet portion 146 and extends upwardly from the annular flange 148 toward first housing 32 and radially outwardly toward the cylindrical inner wall 151 of the recess 150. An O-ring 152 is disposed in the space between the conical protrusion 147, the flange 148, and the inner wall 151.

Figure 8A:
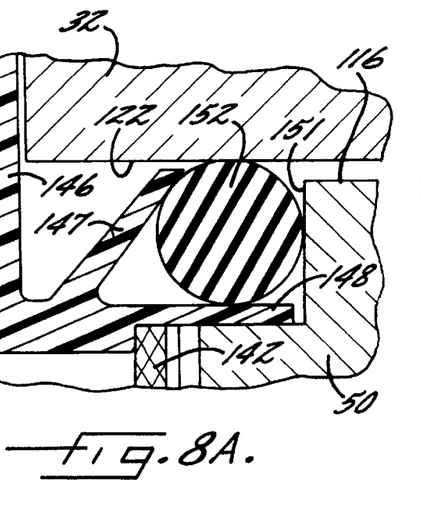
FIG. 8A is a cross-sectional view similar to FIG. 7, on an enlarged scale, showing one of the filter and O-ring assemblies in an uncompressed condition prior to the modules being secured together.
Figure 8B:
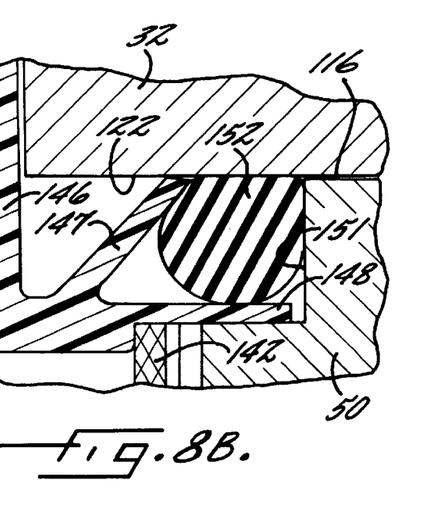
FIG. 8B is a view similar to FIG. 8A showing the filter and O-ring assembly in a compressed condition after the modules have been secured together in abutting relationship.

In an uncompressed condition of the O-ring 152, the height of the O-ring is such that the O-ring extends upward above the upper end of the deformable cone 147 and above the mating face 116, as shown in FIG. 8A. Thus, when the first module housing 32 is moved toward the second module housing 50 to bring the modules into abutting relation, the O-ring 152 is contacted by the mating face 122 of the first module housing 32 before the mating face 122 contacts the deformable cone 147 and before the mating face 122 contacts the mating face 116 of the second housing. Further movement of the housing 32 toward the housing 50 then causes compression of the O-ring between the mating face 122 of the first housing 32 and the ring flange 148. Still further movement of the first housing 32 toward the second housing 50 causes further vertical compression of the O-ring and also causes the mating face 122 to contact and compress the deformable cone 147 which, by virtue of its conical shape, expands radially outwardly. As a result, the O-ring 152 is also compressed in a horizontal direction between the deformable cone 147 and the inner wall 151 of the recess 150, as shown in FIG. 8B. Accordingly, the O-ring 152 is sealed against both surfaces 122 and 151 simultaneously, to prevent escape of fluid from the passage 48 around the outside of the O-ring 152, and to prevent escape of fluid from the passage 140 over the top of the O-ring 152 between the mating faces of the two housings. Additionally, the deformable cone 147 is preferably made of plastic, as is the entire filter body, and polymeric cold flow of the cone occurs when the module housings are abutted together such that a sealing interface exists between the upper end of the cone 147 and the mating face 122 of the first housing. That is, the cone 147 distorts to conform to any surface irregularities of the mating face 122. This sealing interface between the cone 147 and the mating face 122 augments the sealing provided by the O-ring 152. Thus, the dual-compression seals provided by the filters 142 and 144 and O-rings 152 establish reliably sealed fluid connections between the passages in the first housing 32 and the corresponding passages 46 and 48 in second housing 50.

As shown in FIG. 7, fluid flowing through the filter 142 in the fluid flow passage 48 passes through a further passage 154 into an access port 156 which extends from the side face 158 of the second housing 50 into the bore 52 in coaxial alignment with the nozzle 88. The access port 156 adjacent the side face 158 is internally threaded to accept a threaded seal plug 160 which compresses an O-ring 162 to seal the access port 156. It will be understood that fluid flowing through the other filter 142 similarly passes through a flow passage 164 into an access port 166 which extends from the opposite side face 168 into the bore 52 in alignment with the other nozzle 86 and is sealed with a seal plug 170 and O-ring 172.

Fluids are supplied to the second module 30 only when the shutoff valves 42 and 44 of the first module 28 are open. The nature and operation of the shutoff valves are further illustrated in FIG. 3 which shows that the valves 42 and 44 include valve handles 174 which are attached to valve stems 176 which in turn carry fluid passages 178. In FIG. 3, the valves are oriented with the valve passages 178 perpendicular to the direction of fluid flow passages 34 and 36 through the first housing 32. In order to open the valves, the handles 174 must be rotated 90° perpendicularly and as seen from their shape and position with respect to the housing 32, are generally rotated inwardly; i.e. the left hand valve handle 42 is rotated clockwise, and the right hand valve handle 44 is rotated counterclockwise.

When the valve handles 174 are rotated in this manner, they overlap and cover the top of the bolt 126 that helps secure the modules together. Alternatively, the bolt 126 cannot be removed, and the modules cannot be separated from one another, until the valve handles 174 are in the closed position rather than the open position. Accordingly, this structure provides the shutoff valve with the means for preventing fluid flow when the first module and the second module are separated from one another, and for preventing the first and second modules from being separated from one another when the shutoff valve is open.

In use, when suitable sources of precursor fluids are connected to the fluid flow fittings 24 and 26 and the shutoff valves 42 and 44 are opened, the fluids pass through the shutoff valves and into the second module and fill the various fluid flow passages up to the nozzles 86 and 88. If the valving rod 56 is in the extended non-dispensing position, the fluids are prevented from entering the mixing chamber 84. When foamable composition is to be dispensed, the operator or an automatic controller activates the motor 66 to rotate the threaded shaft 60 causing the piston 58 to retract the valving rod 56 to the dispensing position to uncover the nozzles 86 and 88 and allow the fluids to flow into the mixing chamber 84 and out the cap 72. When the dispense cycle is to be stopped, the motor 66 is activated in the opposite direction to cause the valving rod 56 to be extended back to the non-dispensing position and thereby stop the flow of the fluids into the mixing chamber.

The forces required to retract and extend the valving rod 56 act in the direction of the axis of the bore 52 in such a manner as to tend to cause relative movement of the second module 30 with respect to the first module 28 along this direction. The dispenser 20 includes features for absorbing these thrust forces so that relative movement of the two modules along the axis of the dispensing valve is substantially prevented. Specifically, with reference to FIGS. 3 and 6, the load cylinder 96 includes a portion that extends outward from the end 70 of the bore 52. A thrust ring 180 is fixed to this portion of the load cylinder 96. The thrust ring 180 extends radially outward from the outer surface of load cylinder 96. The first module 28 includes a recess 182 formed as a half-cylinder for receiving the end portion of the load cylinder 96. The recess 182 has a circular groove 184 for receiving the thrust ring 180. The second module 30 similarly includes a half-cylindrical recess 182 and groove 184 (FIG. 2) for receiving the load cylinder 96 and thrust ring 180. Forces exerted for retracting and extending the valving rod 56 are transmitted via the die spring 94 through the load cylinder 96 to the thrust ring 180, which spreads the forces over both the first and second modules via the interaction of the thrust ring 180 with both modules, such that relative movement between the modules is substantially prevented in the direction along the bore axis. Thus, by virtue of the combination of the split tang 114 with tapered key hole and offset bolt 126, and the thrust ring 180 and grooves 184, the modules are securely fixed together so that no substantial relative movement occurs either along the bore axis or normal to the bore axis along the direction defined by the tang 114.

The dispenser 20 also includes features facilitating the cleaning of the dispenser. It will be appreciated that a dispense cycle exposes a number of surfaces in the dispenser to the mixed precursors, which react to form foam whereever they happen to be, whether outside or inside the dispenser. In particular, with reference to FIG. 6, the inner surfaces of the mixing chamber 84 and the cap 72 are exposed to the mixture, and therefore the outer surface of the valving rod 56 is also exposed from about the stepped washer 90 to the valving rod tip 186 as the valving rod is wiped by the inner surfaces of the mixing chamber upon being returned to the non-dispensing position following a dispense cycle. The tip 186 itself is also exposed to the mixture, as it comprises the rear boundary of the mixing chamber 84 during a dispense cycle.

The cylindrical outer surface of the valving rod 56 is cleaned, in accordance with one embodiment of the invention depicted in FIGS. 1–9, by being scraped by inner surfaces of the stepped washer 90. The hole 92 through the washer is sized to fit closely about the valving rod 56. For example, the valving rod outer diameter is nominally about 4.750 mm and the inner diameter of the hole 92 is nominally about 4.763 mm. When the valving rod 56 is retracted during a dispense cycle, as indicated by phantom lines in FIG. 6, the outer surface of the rod is scraped by the washer 90. As previously described, solvent also fills the space between the load cylinder 96 and the scraper washer 90, and hence the outer surface of the valving rod 56 is bathed in solvent, which aids in the removal of precursor residue from the rod.

Figure 11:
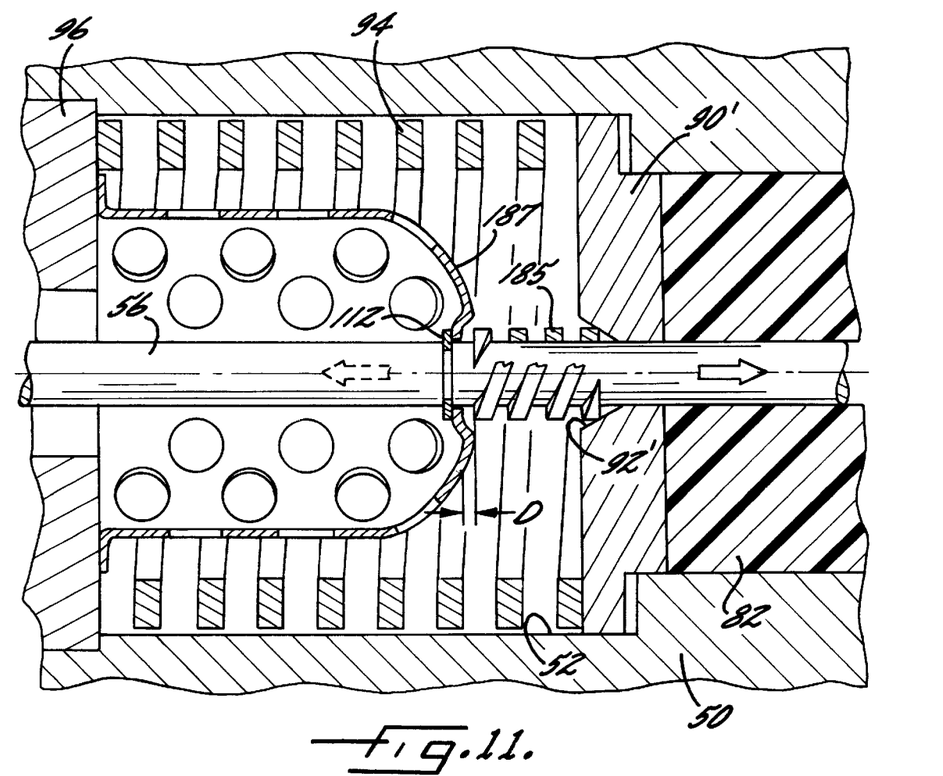
FIG. 11 depicts a helical spring wrapped about the valving rod for scraping the valving rod.

FIG. 11 depicts an alternative arrangement for scraping the valving rod 56 having an additional scraping member for augmenting the cleaning action of the scraper washer. Specifically, a helical spring 185 is wrapped about the valving rod. The spring 185 has a relaxed inner diameter which is slightly smaller than the outer diameter of the valving rod, and the spring 185 is press-fit over the valving rod so that it tightly grips the rod. The spring 185 extends over a portion of the length of the rod between the washer 90' and a stop member 187, shown in FIG. 11 as a perforated cup or can, having a hole through which the valving rod extends. The stop member 187 has one end which abuts the load cylinder 96 and an opposite end that is generally closed except for the hole for the valving rod 56 to pass through.

Thus, the spring 185 abuts the generally closed end of the can 187 when the valving rod is retracted to the left in FIG. 11. When the valving rod is in a fully extended position as shown in FIG. 11, there is a gap D between the can 187 and the end of the spring 185, the gap D being, for example, about zero to about 0.015 inch. Accordingly, axial movement of the valving rod 56 in either direction causes the spring 185 to abut either the tapered surface 92' of the washer 90' (during extension of the rod) or the stop member 187 (during retraction of the rod). Further axial movement of the valving rod then causes the spring 185 to be compressed until at some point the spring's grip on the rod lessens enough to permit the valving rod 56 to slide relative to the spring.

The helical turns of the spring 185 scrape the outer surface of the valving rod 56 as the rod slides within the spring. The plurality of helical turns improve the probability that substantially the entire circumference of the valving rod is scraped, relative to a single helical turn or a single washer or the like. The spring 185 is preferably formed of a wire having a rectangular cross-section, with one of the flat sides of the wire lying flush against the valving rod 56, as shown in FIG. 11. Advantageously, the spring is formed of a metal having a lower hardness than that of the valving rod, so that wear between the spring and the valving rod occurs primarily on the spring.

Figure 10:
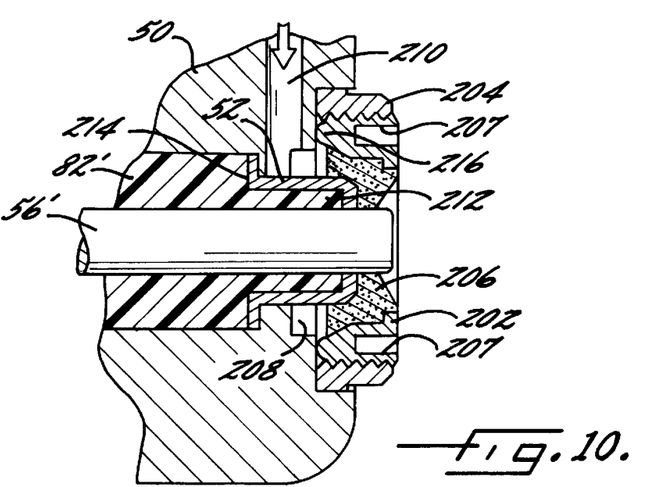
FIG. 10 is cross-sectional view similar to FIG. 9, showing an alternative embodiment of a dispensing valve tip.

With primary reference to FIGS. 3, 9, and 10, the valving rod tip 186 advantageously is cleaned at the end of each dispense cycle by passing a solvent, or more preferably a mixture of solvent and air, over the tip 186. To this end, the cap 72 includes an axially extending counterbore 188 of larger diameter than the valving rod 56, such that an annular chamber 190 surrounds the valving rod adjacent the outer surface of the cap 72. For example, the valving rod diameter is nominally about 4.75 mm, and the counterbore 188 is nominally about 4.95 mm in diameter. An air/solvent passage 192 extends through the cap 72 into the annular chamber 190. An air/solvent passage 194 extends through the second housing 50 from the mating face 116 to the air/solvent passage 192. The first module 28 similarly includes an air/solvent passage (not shown) which extends to the first module's mating face 122 and aligns with and fluidly connects to the air/solvent passage 194, and which is supplied with air/solvent mixture from a suitable source through a fitting 196 (FIG. 3) on the first housing 32.

With particular reference to FIG. 9, following each dispense cycle, the valving rod 56 is re-extended to the position shown in FIG. 9 to shut off supply of the precursor fluids to the mixing chamber 84. Before the mixed precursor chemicals on the end portion of the valving rod have an opportunity to complete their reaction and harden on the valving rod, an air/solvent mixture is delivered through the fitting 196 (FIG. 3) into the annular chamber 190. Preferably, a mixture of about 50 percent air and about 50 percent solvent (by volume) is supplied at a pressure of about 3.0 psig. The air/solvent mixture flows outwardly from the annular chamber 190, entraining and carrying the residual foam chemicals with it.

The valving rod tip 186 advantageously is rounded to promote the flow of the air/solvent mixture over the tip 186 to clean it. Further, in order to reduce the likelihood of foamable composition flowing onto the outer surface 198 of the cap 72 during a dispense cycle, the cap outer surface 198 is preferably a protruding frustoconical shape adjacent the valving rod tip. The tip 186 preferably is a frustoconical shape with a rounded apex, forming an extension of the frustoconical outer surface 198 of the cap 72. Alternatively, the valving rod tip is a hemispherical shape. The inner surfaces of the cap counterbore 188, the cap outer surface 198, and the valving rod tip 186 preferably are coated with a release material such as TFE, PTFE, or other release material, in order to reduce the likelihood of foam deposits becoming irremovably adhered to these surfaces. As an alternative to coating the inner surfaces of the cap counterbore 188 and the frustoconical portion of the cap 72, the cap 72 may include an insert of solid TFE or the like, with the inner surface of the insert defining the counterbore 188 and a frustoconical portion of the insert forming an extension of the frustoconical tip 186 of the valving rod.

Although one aspect of the invention provides a dispenser having an improved cleaning capability by virtue of a cap 72 and rounded valving rod tip 186, other aspects of the invention are applicable to dispensers having dispenser tips of various other types. FIG. 10 depicts one such alternative dispenser tip in which a removable threaded cap 202 having a sintered element 206 is screwed into a threaded insert 204 which is press-fit into the housing 50 at the dispensing end of the axial bore 52. A related sintered cap is fully described in U.S. Pat. No. 4,898,327, assigned to the assignee of the present application, and incorporated herein by reference. The sintered cap of the present invention differs from the cap described in the '327 patent in several respects. The cap 202 includes an insert 206 of a sintered material surrounding the valving rod 56'. The removable cap 202 also includes slots or recesses 207 for engagement by a tool, such as a spanner wrench, for removing the cap 202. An annular chamber 208 is defined by a portion of the bore 52 in fluid communication with the sintered insert 206, and the housing 50 includes a solvent/air passage 210 through which a mixture of solvent and air similar to that previously described is supplied to the annular chamber 208. The plastic valve body 82' includes a reduced-diameter portion 212 at its forward end, and a stainless steel cap 214 fits over the reduced-diameter portion 212 to bear against the removable cap 202. The stainless steel cap 214 also helps prevent cold-flow deformation of the plastic valve body 82'.

Following a dispensing cycle, air/solvent mixture is pumped into the annular chamber 208 under pressure, and the solvent penetrates through the pores of the sintered insert 206 to prevent foam chemical residue from accumulating on the sintered insert 206. The cap 202 includes an integral raised ridge 216 at its back end which contacts a face of the housing 50 and acts to seal the annular chamber 208 so that the air/solvent mixture flows out through the sintered insert 206.

In the drawings and specification, there have been disclosed typical preferred embodiments of the invention, and although specific terms have been employed, they have been used in a generic and descriptive sense only and not for purposes of limitation, the scope of the invention being set forth in the following claims.

What is claimed is:

1. A dispenser for dispensing foamable compositions, comprising:

a first module having a first housing which includes fluid flow passages extending therethrough to a mating face of the first housing;

a second module having a second housing which includes an axial bore therethrough and fluid flow passages extending from a mating face of the second housing into the bore, the second module being adapted to be secured to the first module with the respective mating faces in confronting relation and the fluid flow passages of the first module in fluid communication with the fluid flow passages of the second module;

a dispensing valve assembly including a valving rod reciprocatingly movable within the bore along an axis thereof, and further including a member fixed to the housing and projecting outward from the housing adjacent an end of the bore, the member including a thrust-bearing projection protruding from the member generally normal to the bore axis; and the first housing including a groove which engages the thrust-bearing projection such that the first and second housings are constrained against substantial relative movement along the direction of the bore.

2. The dispenser of claim 1 wherein the member fixed to the housing comprises a load cylinder through which the valving rod extends and which is partially inserted and fixed into the bore adjacent the end thereof, an end portion of the load cylinder extending from the bore, the end portion having the radially protruding thrust-bearing projection thereon.

3. The dispenser of claim 2, wherein the dispensing valve assembly includes a deformable valve body having a valve passage through which the valving rod extends, and further comprising a coil compression spring disposed between the valve body and the load cylinder and preloaded to apply an axial load therebetween.

4. The dispenser of claim 3 wherein the thrust-bearing projection comprises a radially protruding ring on the load cylinder.

5. The dispenser of claim 4 wherein the groove in the first housing is formed in a recess of the first housing, the recess being formed as a portion of a cylinder for receiving the end portion of the load cylinder extending from the bore in the second housing.

6. The dispenser of claim 5, further comprising pins inserted through holes in the second housing and engaging the load cylinder for retaining the cylinder in position under the load of the compression spring.

7. The dispenser of claim 6 wherein the load cylinder includes a circumferential groove in its outer surface for receiving the pins.

8. The dispenser of claim 6 wherein the pins are accessible from only one face of the second housing, and further comprising a cover applied to said face covering the pins.

9. The dispenser of claim 1 wherein one of the first and second housings includes a tang projecting from the mating face of the one housing and having a tapered key hole therethrough, and the other of the first and second housings includes a slot extending into the other housing from the mating face thereof for receiving the tang, the other housing further including a hole extending into the slot, and including a bolt extending through the hole into the slot and having a tapered portion for engaging the tapered key hole.

10. The dispenser of claim 9 wherein the one housing comprises the second housing and the other housing comprises the first housing.

11. The dispenser of claim 10 wherein the hole in the first housing is offset relative to the key hole in the tang when the respective mating faces of the first and second housing are abutting each other, the hole in the first housing being offset in the direction along which the tang is inserted into the slot such that the tapered portion of the bolt exerts a force on the tang urging the second module against the mating face of the first module.

12. The dispenser of claim 11 wherein the tang is split from the key hole to the end of the tang to permit elastic expansion of the split end as the bolt is engaged in the tapered key hole, the elastically expanded split end exerting continuous forces on the bolt tending to urge the first and second modules together.

13. The dispenser of claim 1 wherein each housing has two fluid flow passages and the first module includes a shutoff valve for each of the fluid flow passages of the first housing.

14. The dispenser of claim 1 wherein the second housing comprises a solid polygon through which the bore and fluid flow passages are formed.

15. A dispenser for dispensing foamable compositions, comprising:

a housing including an axial bore extending therethrough and fluid flow passages in fluid communication with the bore;

a dispensing valve including a deformable valve body within the bore having an axial valve passage therethrough and orifices into the valve passage which are in fluid communication with the fluid flow passages of the housing, and a valving rod axially retractable within the valve passage to uncover the orifices and permit fluids to flow into the valve passage and be dispensed from one end thereof; and a coil compression spring disposed in the bore and preloaded to apply a substantially constant compression force on the valve body in a direction along the axis of the valving rod.

16. The dispenser of claim 15, further comprising a washer disposed between one end of the compression spring and the valve body for distributing the compressive force of the spring over an end face of the valve body.

17. The dispenser of claim 16 wherein the compression spring has an outer diameter greater than the outer diameter of the valve body.

18. The dispenser of claim 16 wherein the valve body is formed of a plastic self-lubricating material.

19. The dispenser of claim 18 wherein the orifices comprise non-deformable nozzles which extend through the valve body into the valve passage thereof.

20. The dispenser of claim 16 wherein the compression spring resides within a solvent chamber comprising an axially extending portion of the bore, the solvent chamber being bounded on one end thereof by the valve body and being sealed for containing solvent.

21. The dispenser of claim 20 wherein the valving rod extends through a hole in the washer, inner surfaces of the hole fitting closely about the valving rod for scraping the valving rod during retraction and extension thereof.

22. A dispenser for dispensing foamable compositions, comprising:

a housing including an axial bore extending therethrough and fluid flow passages in fluid communication with the bore;

a dispensing valve including a valve body within the bore having an axial valve passage therethrough and orifices into the valve passage which are in fluid communication with the fluid flow passages of the housing, and a valving rod axially retractable within the valve passage to uncover the orifices and permit fluids to flow into the valving passage and be dispensed from one end thereof; and a stepped scraper washer fixed within the bore and having a hole which is aligned with the valve passage and through which the valving rod extends, inner surfaces of the hole fitting closely about the valving rod for scraping the valving rod during retraction and extension thereof.

23. The dispenser of claim 22 wherein the stepped scraper washer includes a smaller-diameter portion abutting the valve body and a larger-diameter portion, and further comprising a resilient member which bears against the larger-diameter portion and urges the stepped scraper washer against the valve body.

24. The dispenser of claim 23 wherein the resilient member comprises a die spring.

25. The dispenser of claim 24 wherein the valve body is formed of a plastic self-lubricating material.

26. A dispenser for dispensing foamable compositions, comprising:
a housing including an axial bore extending therethrough and fluid flow passages in fluid communication with the bore;
a dispensing valve including a valve body within the bore having an axial valve passage therethrough and orifices into the valve passage which are in fluid communication with the fluid flow passages of the housing, and a valving rod axially movable within the valve passage from a non-dispensing position to a dispensing position in which the valving rod is retracted to uncover the orifices and permit fluids to flow into the valve passage and be dispensed from one end thereof and out a dispensing opening of the dispenser; and
a cap fixed within the bore adjacent the one end of the valve passage and forming an annular chamber which surrounds an end portion of the valving rod, the cap including a solvent passage extending into the annular chamber for supplying solvent thereinto, a tip of the valving rod in the non-dispensing position being exposed to the annular chamber, whereby the tip is cleaned by flowing solvent into the annular chamber and outwardly therefrom over the tip.

27. The dispenser of claim 26 wherein an outer face of the cap is coated with a release material.

28. The dispenser of claim 27 wherein the tip of the valving rod is rounded to promote flow of solvent over the tip, and the tip is coated with a release material for reducing adhesion of foam residue to the tip.

29. The dispenser of claim 28 wherein the tip of the valving rod is frustoconical with a rounded apex.

30. The dispenser of claim 26 wherein the cap includes a generally annular insert of a solid self-lubricating material, the insert defining the inner surface of the annular chamber.

31. The dispenser of claim 30 wherein an outer face of the insert adjacent the valving rod is frustoconical.

32. The dispenser of claim 26 wherein an outer face of the cap adjacent the valving rod is frustoconically shaped and is coated with a release material, and the valving rod tip is frustoconical with a rounded apex and is coated with a release material.

33. A dispenser for dispensing foamable compositions, comprising:
a housing including an axial bore extending therethrough and fluid flow passages in fluid communication with the bore;
a dispensing valve including a valve body within the bore having an axial valve passage therethrough and orifices extending generally radially into the valve passage which are in fluid communication with the fluid flow passages of the housing, and a valving rod axially movable within the valve passage to uncover the orifices and permit fluids to flow into the valving passage and be dispensed from one end thereof; and
access ports extending through the housing and aligned with the orifices so as to provide a path for each orifice for the passage of a cleaning tool into the orifice.

34. The dispenser of claim 33 wherein the housing has a pair of side faces spaced on opposite sides of the bore, the valve body has a first orifice extending toward one of the side faces of the housing and a second orifice extending toward the other side face, and one access port extends from the one side face into the one of the orifices and a second access port extends from the other side face into the other of the orifices.

35. The dispenser of claim 33, further comprising a removable seal plug in each access port for sealing the access port to prevent escape of fluid therefrom.

36. A dispenser for dispensing foamable compositions, comprising:
a housing including an axial bore extending therethrough and fluid flow passages in fluid communication with the bore;
a dispensing valve including a valve body within the bore having an axial valve passage therethrough and orifices into the valve passage which are in fluid communication with the fluid flow passages of the housing, and a valving rod axially movable within the valve passage to uncover the orifices and permit fluids to flow into the valving passage and be dispensed from one end thereof, a portion of the bore comprising a solvent chamber; and
a helically formed spring having a plurality of helical turns press fit over the valving rod and residing within the solvent chamber between a pair of spaced apart fixed members which the spring alternately abuts during retraction and extension of the valving rod to cause relative sliding motion between the valving rod and the spring for cleaning foam residue from the valving rod.

37. The dispenser of claim 36 wherein the spring is formed of a wire having a generally rectangular cross-section.

38. A dispenser for dispensing foamable compositions, comprising:
a housing including an axial bore extending therethrough and fluid flow passages in fluid communication with the bore;
a dispensing valve including a valve body within the bore having an axial valve passage therethrough and orifices into the valve passage which are in fluid communication with the fluid flow passages of the housing, and a valving rod axially movable within the valve passage from a non-dispensing position to a dispensing position in which the valving rod is retracted to uncover the orifices and permit fluids to flow into the valve passage and be dispensed from one end thereof and out a dispensing opening of the dispenser;
the housing defining a solvent chamber in the axial bore adjacent the one end thereof, and including a solvent passage for delivering solvent through the housing into the solvent chamber; and
a removable cap fixed within the bore adjacent the one end of the valve passage, the cap including an insert of a sintered material, the insert having a central hole therethrough into which a tip of the valving rod extends in the non-dispensing position, the cap being removably fixed within the bore with the sintered insert in communication with the solvent chamber, whereby the tip is cleaned by flowing solvent into the solvent chamber and through the sintered insert over the tip.

39. The dispenser of claim 38 wherein the cap is externally threaded, and the housing includes internal threads for engaging the cap to retain the cap in place.

40. The dispenser of claim 38 wherein the cap includes an integral raised ridge on a rear surface thereof, and the housing includes a face which is contacted by the raised ridge, the raised ridge sealing the solvent chamber to prevent solvent from flowing around the sintered insert.

41. The dispenser of claim 38 wherein the valve body includes a forward portion of reduced diameter, and the axial bore in the housing includes a reduced-diameter portion within which the reduced-diameter portion of the valve body resides.

42. The dispenser of claim 41, further comprising a metal cap sleeved over the reduced-diameter portion of the valve body for reducing cold-flow deformation thereof.

43. The dispenser of claim 38 wherein the housing includes an insert press fit into the one end of the axial bore, the insert having internal threads, and wherein the cap is externally threaded for removably engaging the internally threaded insert.

44. A dispenser for dispensing foamable compositions, comprising:

a first module having a first housing which includes a fluid flow passage extending therethrough to a mating face of the first housing;

a second module having a second housing which contains a dispensing valve for dispensing foamable compositions therefrom, the second housing including a fluid flow passage extending from a mating face of the second housing into the dispensing valve, the second module being adapted to be secured to the first module with the respective mating faces abutting each other and the fluid flow passage of the first module aligned with the fluid flow passage of the second module;

a recess formed in the mating face of one of the modules surrounding the fluid flow passage thereof, a fluid space being defined by the recess and the mating face of the other module; and a deformable member disposed in the fluid space and adapted to be compressed by the mating face of the other module, and an O-ring surrounding the deformable member, the deformable member having a tapered tubular shape such that compression of the deformable member causes a tubular wall of the deformable member to deflect outwardly to compress the O-ring in a first direction between the tubular wall and an inner wall of the recess, and the O-ring being compressed in a second direction by the mating face of the other module in the direction of the mating face of the one module.

45. The dispenser of claim 44 wherein the deformable member is formed on a filter assembly at least partially disposed in the fluid flow passage of the one of the modules, the filter including an annular flange which seats within the recess in the one of the modules and surrounds the deformable member, the O-ring being retained between the wall of the deformable member and the annular flange.

* * * * *